(12) United States Patent
Garcia

(10) Patent No.: US 6,272,159 B1
(45) Date of Patent: Aug. 7, 2001

(54) LASER DIODE PACKAGE WITH SLOTTED LEAD

(75) Inventor: Juan Alfonso Garcia, Tucson, AZ (US)

(73) Assignee: Opto Power Corp, Tucson, AZ (US)

(*) Notice: Subject to any disclaimer, the term of this patent is extended or adjusted under 35 U.S.C. 154(b) by 0 days.

(21) Appl. No.: 09/218,887

(22) Filed: Dec. 22, 1998

Related U.S. Application Data

(63) Continuation-in-part of application No. 09/189,952, filed on Nov. 12, 1998, now Pat. No. 6,177,203.

(51) Int. Cl.[7] ............... H01S 3/04; H01S 3/091
(52) U.S. Cl. .................. 372/36; 372/75
(58) Field of Search ............... 372/36, 35, 38, 372/44, 34, 43, 50, 75, 69

(56) References Cited

U.S. PATENT DOCUMENTS 4,627,062 * 12/1986 Bender .................... 372/36

* cited by examiner

*Primary Examiner*—Quyen P. Leung
(74) *Attorney, Agent, or Firm*—Herbert M. Shapiro

(57) ABSTRACT

A laser diode or laser diode bar mounted on a heat sink and having an insulating layer of greater thickness also mounted on the heat sink requires a lead overlying both the insulating layer and the diode to bend downward for making electrical contact. Failures have been found to occur at the bend. The provision of a pattern of slots at the bend alleviates the problem by reducing stress there. The use of such slotted leads is disclosed for diodes or diode bars individually or in a stack arrangement.

11 Claims, 10 Drawing Sheets

LASER DIODE PACKAGE WITH SLOTTED LEAD

This application is a continuation-in-part of application Ser. No. 09/189,952 now U.S. Pat. No. 6,177,203 filed Nov. 12, 1998 for the present inventor and assigned to the assignee of the present application.

BACKGROUND OF THE INVENTION

Laser diodes and laser diode bars are available commercially. Many such devices comprise a laser diode or laser diode bar mounted on a heat sink and also includes electrical contact to the laser. Such a device also comprises an electrical insulator also positioned on the heat sink and typically having a thickness greater than that of the laser. An electrical conductor (lead) is positioned on top of the insulator and bends downward to make contact with the laser. The lead is positioned to contact a next adjacent laser assembly if a stack configuration is desired and provides electrical continuity with that next heat sink.

Laser diode packages of this type, although very competitive in cost and performance, suffer a reduced yield due to the bending of the lead which overlies the insulating layer and contacts the laser.

BRIEF DESCRIPTION OF THE INVENTION

In accordance with the principles of this invention, the above-noted lead includes a plurality of slots at the bend in the lead with the axes of the slots being aligned with the long dimension of the lead. In one embodiment where a stack of lasers, each attached to an associated heat sink, is assembled, the lead takes the form of a rectangular loop with an open central area of a shape to permit continuity between adjacent heat sinks of the stack.

DETAILED DESCRIPTION OF AN ILLUSTRATIVE EMBODIMENT OF THE INVENTION

Figure 1:
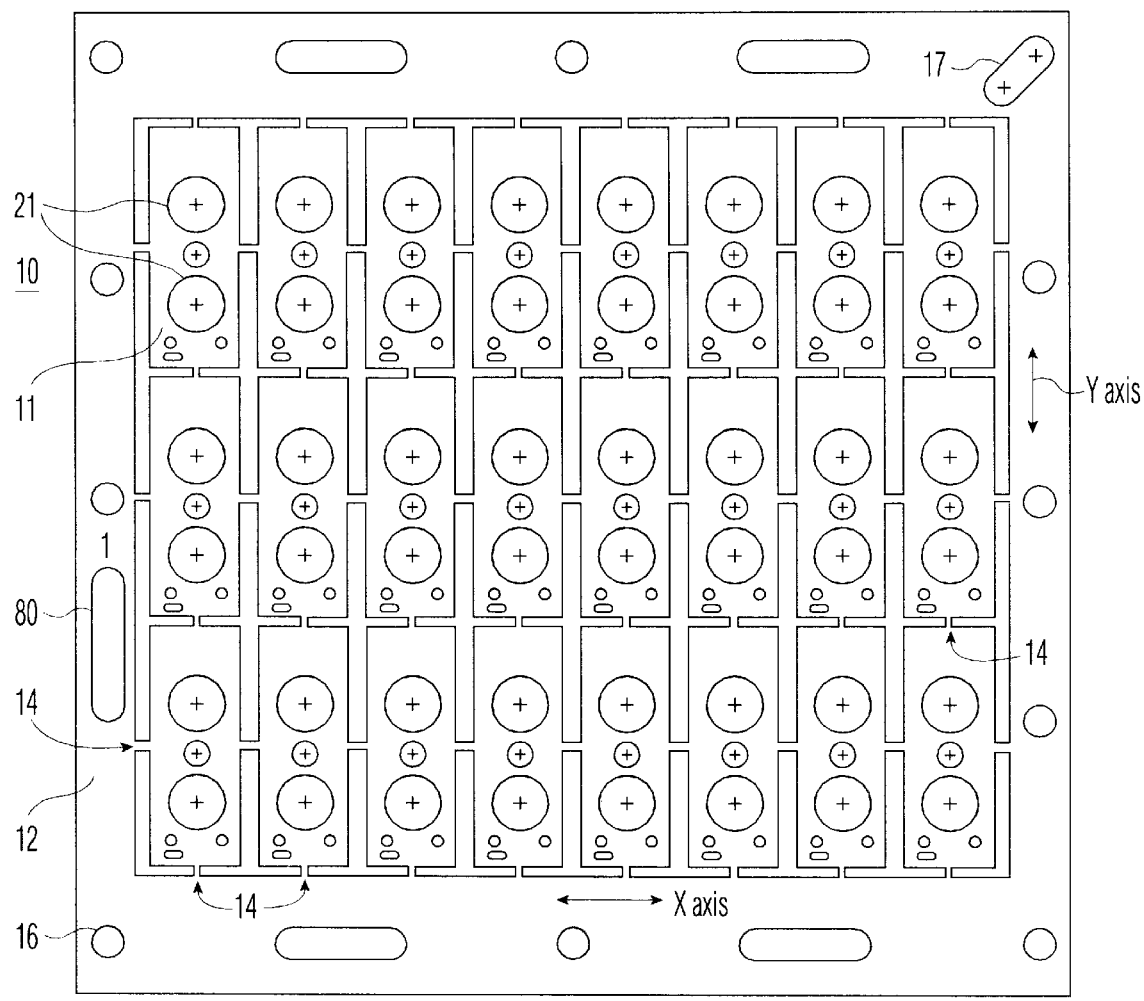
FIG. 1 is a top view of an array of laser diode heat sinks subassemblies on which a laser diode or diode bar is mounted in accordance with the principles of this invention.

FIG. 1 shows an array 10 of twenty-four identical heat sink assemblies 11. The heat sink assemblies are maintained in a plane by a frame 12 which surrounds the array and by tabs 14 which interconnect the assemblies in the rows (i.e. x axis) and the columns (i.e. y axis) of the array.

The frame includes a small hole 16 at the corner at the lower left of the frame as viewed in FIG. 1. The frame also includes a slot 17 at the corner at the upper right of the frame as viewed. Hole 16 and slot 17 are important features of the frame because they permit the array to adjust uniformly to any expansion and contraction of the piece parts during the temperature excursions which occur during diffusion bonding. In the absence of hole 16 and slot 17, the temperature excursions during bonding of multilayer parts of the array causes unequal misalignment in different portions of the layers resulting in a significant reduction in yield.

The necessity for maintaining the alignment of the layers of the piece parts is particularly useful for small solid state multilayer layer piece parts such as the illustrative heat sink described herein. Specifically, FIGS. 2 through 6 show top views of the sequence of layers to be aligned and simultaneously diffusion bonded for forming the array of heat sinks herein. The layers are stacked in a jig (not shown) which includes pins which insert through hole 16 and slot 17. The same numbers are used for each of the layers to designate common features in order to avoid confusion and to simplify comparisons between layers.

Figure 2:
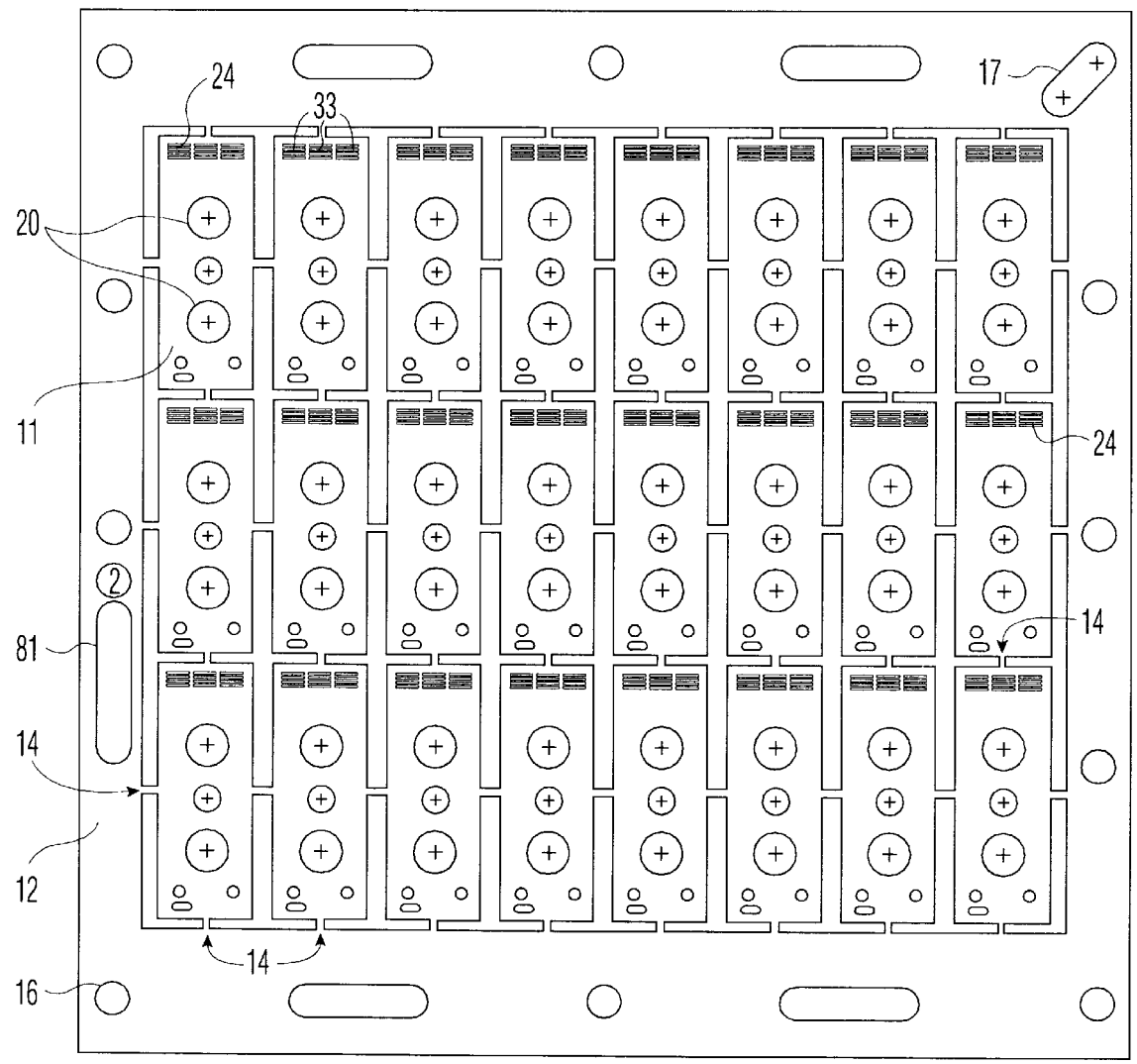
FIGS. 2–6 are top views of the component layers of the heat sink of the array of FIG. 1.

FIG. 1 can be taken to represent the array of completed heat sinks or, alternatively, the top subassembly of the sequence of layers in the heat sinks. FIG. 2 represents the next lower layer (or subassembly). Note that the holes 20 in each of the heat sink subassembly of FIG. 2 (shown at the upper left in FIG. 2) have smaller diameters than the holes 21 of FIG. 1 with which they are aligned. Note also that each heat sink in the subassembly of FIG. 2 includes a grating 24 which will be seen to represent a significant feature of a heat sink herein.

Figure 3:
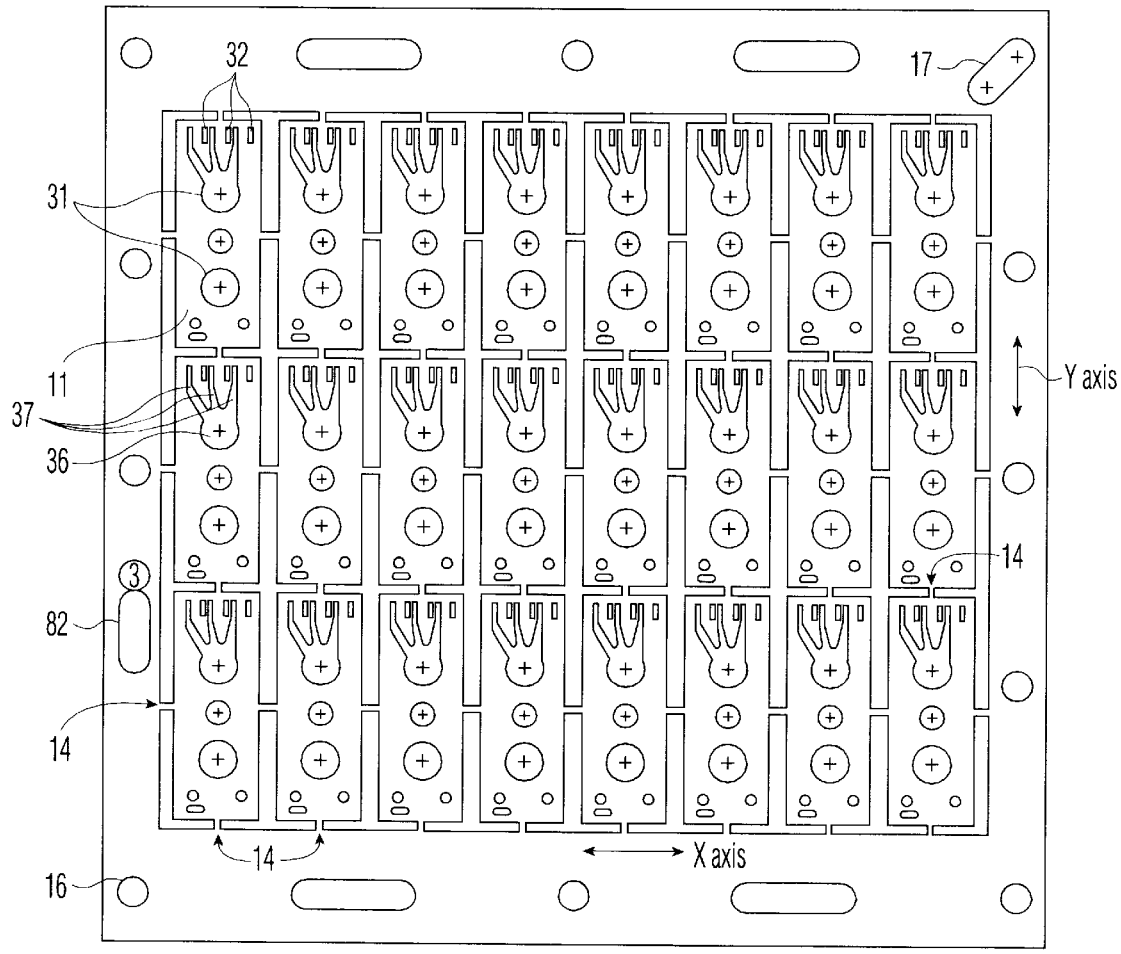

FIG. 3 represents the next lower subassembly of the array of heat sinks. Each heat sink subassembly in FIG. 3 includes holes 31 having diameters equal to that of holes 20 of FIG. 2 and are aligned with those holes. Each heat sink subassembly also includes three slots 32 which align illustratively with the right side of grating sections 33 of the corresponding heat sink subassembly of FIG. 2. Each heat sink subassembly of FIG. 3 also includes a recess 36 having three upward extensions 37 which align with the left side of the grating sections of the corresponding heat sink subassembly of FIG. 2.

Figure 4:
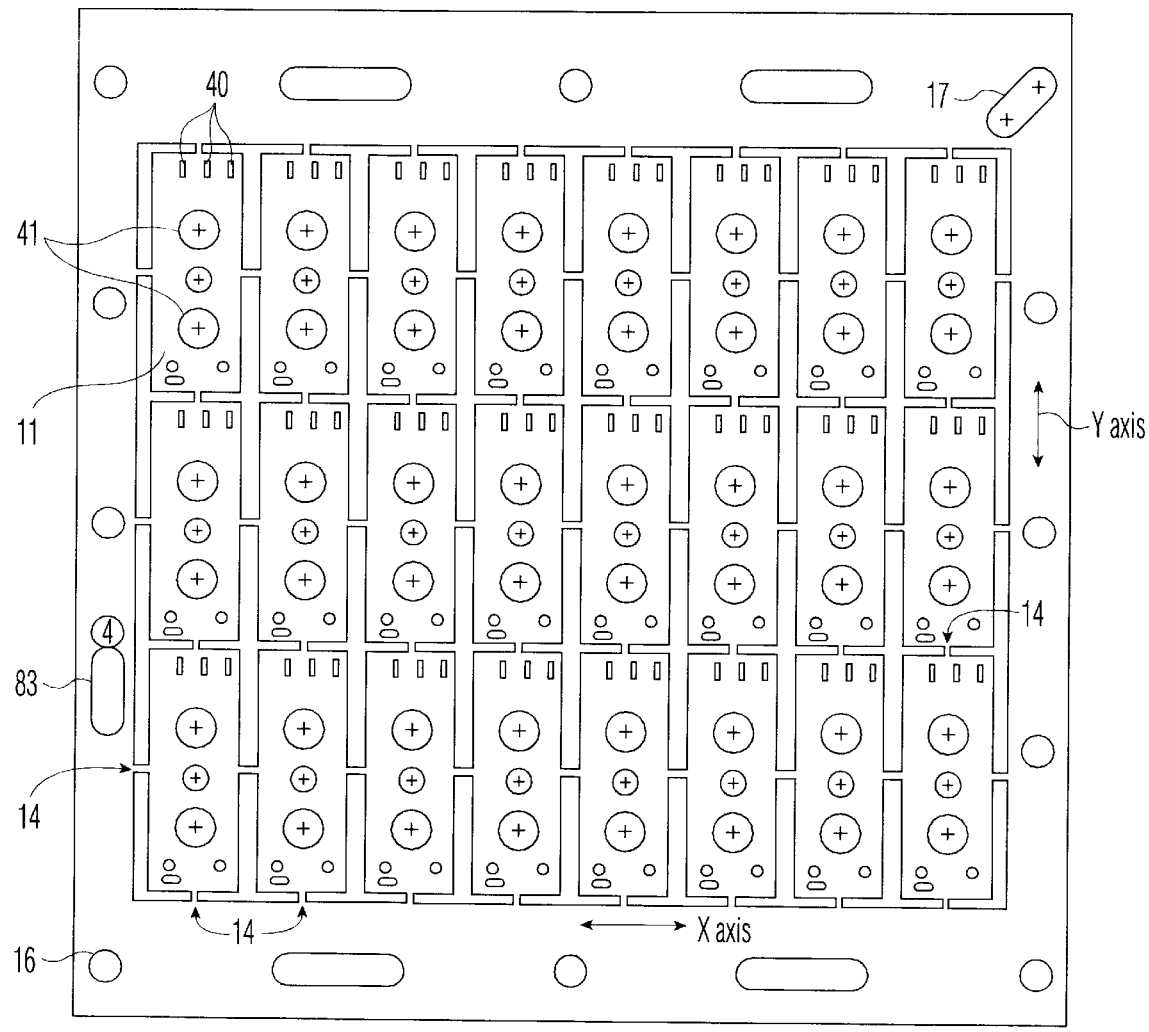

FIG. 4 shows the next lower heat sink subassembly layer. Each heat sink subassembly in the layer of FIG. 4 includes a set of three slots 40 which align with the slots 32 of the corresponding heat sink subassembly of the layer of FIG. 3. Holes 41 in each of the heat sink subassemblies have diameters equal to that of holes 20 of FIG. 2.

Figure 5:
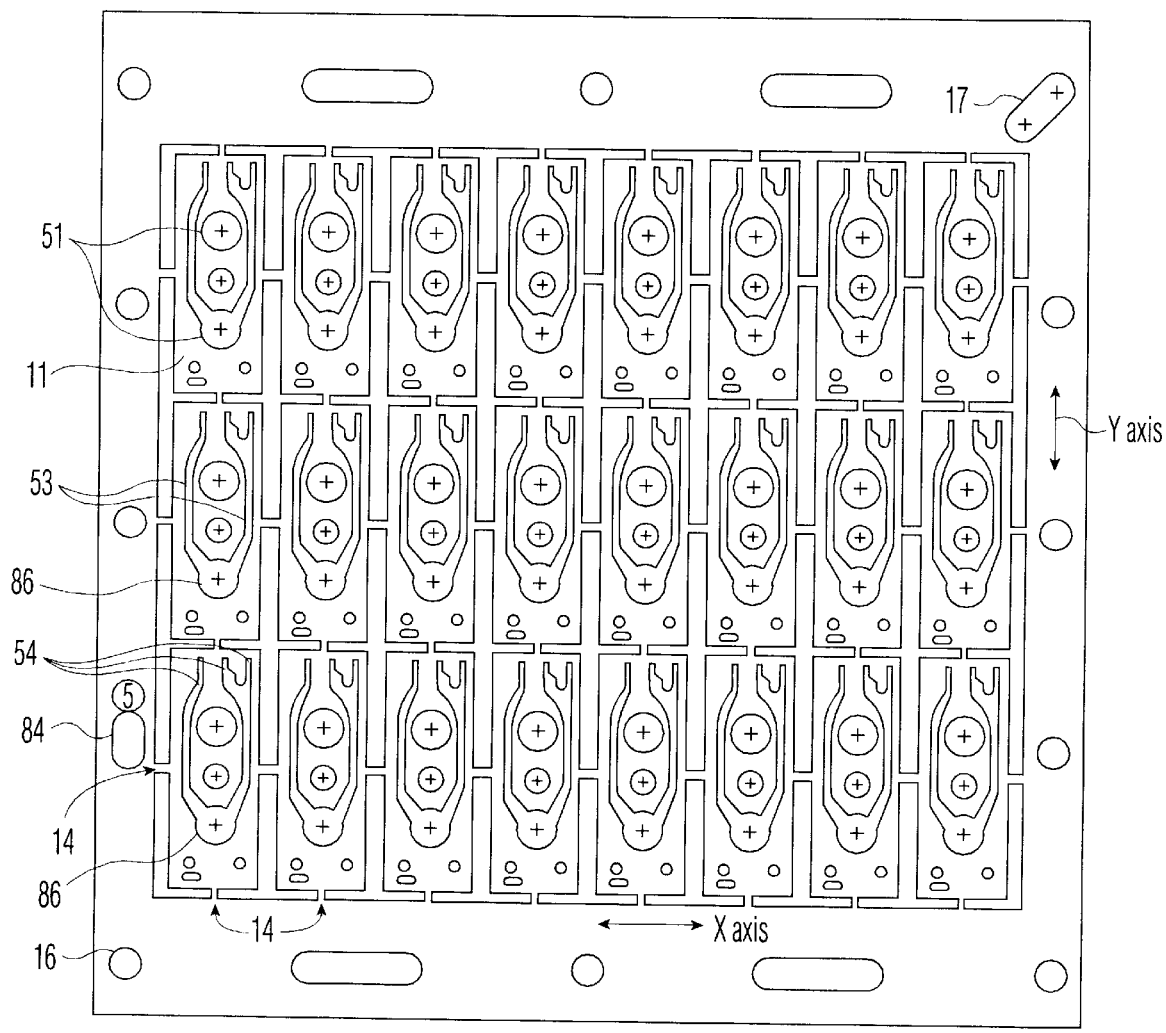

FIG. 5 shows the next lower layer of the heat sink of FIG. 1. Each heat sink subassembly in the layer of FIG. 5 includes holes 51 having diameters equal to the diameter of holes 20 of FIG. 2. In addition each heat sink subassembly of the layer of FIG. 5 includes a recess 53 which extends upwards (as viewed) from a hole 51 forming two arms which terminate in a set of three fingers 54. The three fingers are aligned with the right side of the grating sections of the corresponding heat sink subassembly (24) shown in FIG. 2.

Figure 6:
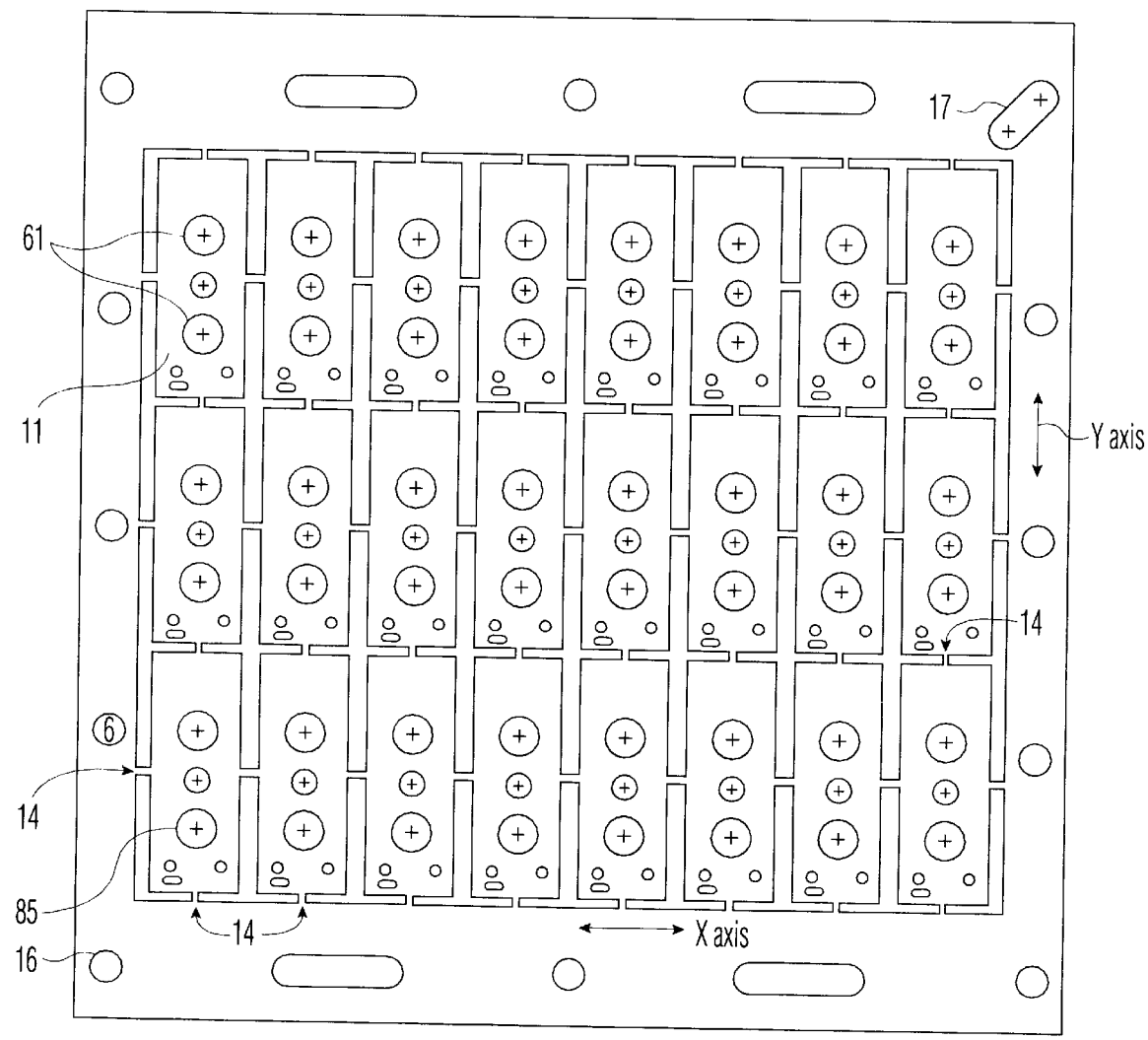

FIG. 6 is the lowest layer of heat sink subassemblies. This layer includes holes 61 having diameters equal to those of holes 20 of FIG. 2.

Figure 7:
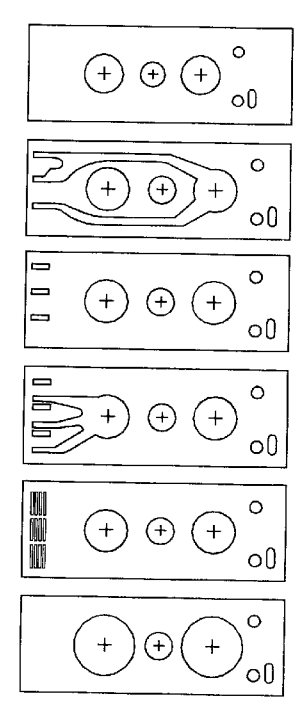
FIG. 7 is a set of subassemblies for a single heat sink of the array of heat sinks of FIGS. 1–6.

The layers of FIGS. 1–6 are stacked and held in alignment by pins (not shown) which insert in hole 16 and slot 17. FIG. 7 depicts the set of subassemblies for a single heat sink of the array of heat sinks.

Figure 8:
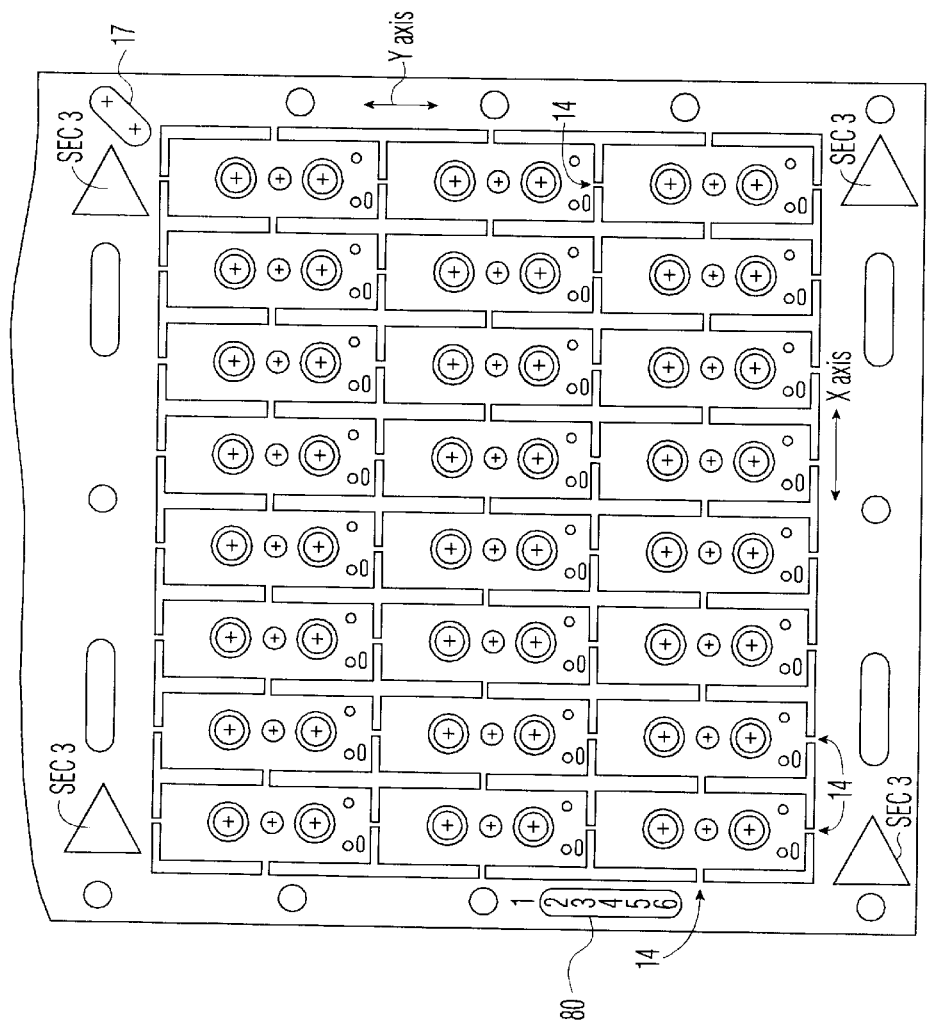
FIG. 8 is a top view of an array of integrated heat sinks with laser diodes in place.

FIG. 8 is a top view of the resulting array of heat sink subassemblies. A slot 80 is provided to expose the numerals 1 through 6 which appear to the left on the layers of FIGS. 1–6, specifically, each layer of FIGS. 1–6 includes a numeral designating the layer and a slot which permits the numerals designating the lower layer designations to be viewed via slot 80 in the top layer of each heat sink. The viewing slots are designated 80, 81, 82, 83, and 84 in FIGS. 1, 2, 3, 4, and 5 respectively. Each slot is associated with a numeral designating the layer and the slots are progressively smaller. There is no such slot for the layer of FIG. 6. Only the numeral is shown. The sequence of numerals is exposed through slot 80 of FIG. 1 and can be confirmed to be in the proper sequence before being subjected to the diffusion bonding process.

A recitation of the various dimensions herein is helpful in appreciating the effects of slight misalignment in the various layers. The layers of FIGS. 2, 3, 4 and 5 have thicknesses of 0.010 inch and is made of copper. The layers of FIGS. 1 and 6 have thicknesses of 0.020 inch and also are made of copper. Hole 21 of FIG. 1 has a diameter of 0.213 inch on 0.470 centers. Holes 20 of FIG. 2 have diameters of 0.200 and are an 0.470 centers. The grating (24) of FIG. 2 has dimensions of 0.391×0.070, twelve openings being shown therein. Each opening has dimensions of 0.125×0.010. The recesses 31 of FIG. 3 are etched to a depth of 0.010. Each piece part in each of the layers of FIGS. 1–6 has dimensions of 0.490×1.230×0.080 when the individual heat sinks are separated from the array.

Each heat sink provides internal paths for coolant to move to and from the gratings of FIG. 2. In practice, laser diodes are positioned in contact with the heat sink in registry with the gratings. A coolant is introduced at hole 85 of FIG. 6 of a heat sink, moves through hole 86 (FIG. 5) in registry with the inlet hole 85. The coolant moves along recess 53 (FIG. 5) upwards as viewed in FIG. 5. Coolant then moves through lots 40 (of FIG. 4) which are positioned to align with the (upper) ends of the "fingers" (54) of recess 53. The coolant then moves through slots 32 (FIG. 3) which are aligned with respective slots 40. The coolant then moves through respective gratings 24 (FIG. 2) from right to left, moves along recess 37 (FIG. 3) downwards as viewed and exits at 36 (FIG. 3).

The stack of layers is placed in a diffusion bonding fixture (not shown) which has a pair of pins positioned to engage hole 16 and slot 17. Hole 16 has a diameter of 0.196 inch and slot 17 has a width of 0.196 inch and a length of 0.439 in the illustrative embodiment. The pins which engage hole 16 and slot 17 have diameters to maintain the stack corner at hole 16 in a fixed position and to allow movement of the opposite corner along the axis of the slot. Because of the frame with one corner in a fixed position and a properly oriented slot in the opposite corner, the alignment between the several layers of the heat sink array is maintained during expansion and contraction during temperature excursions.

Figure 9:
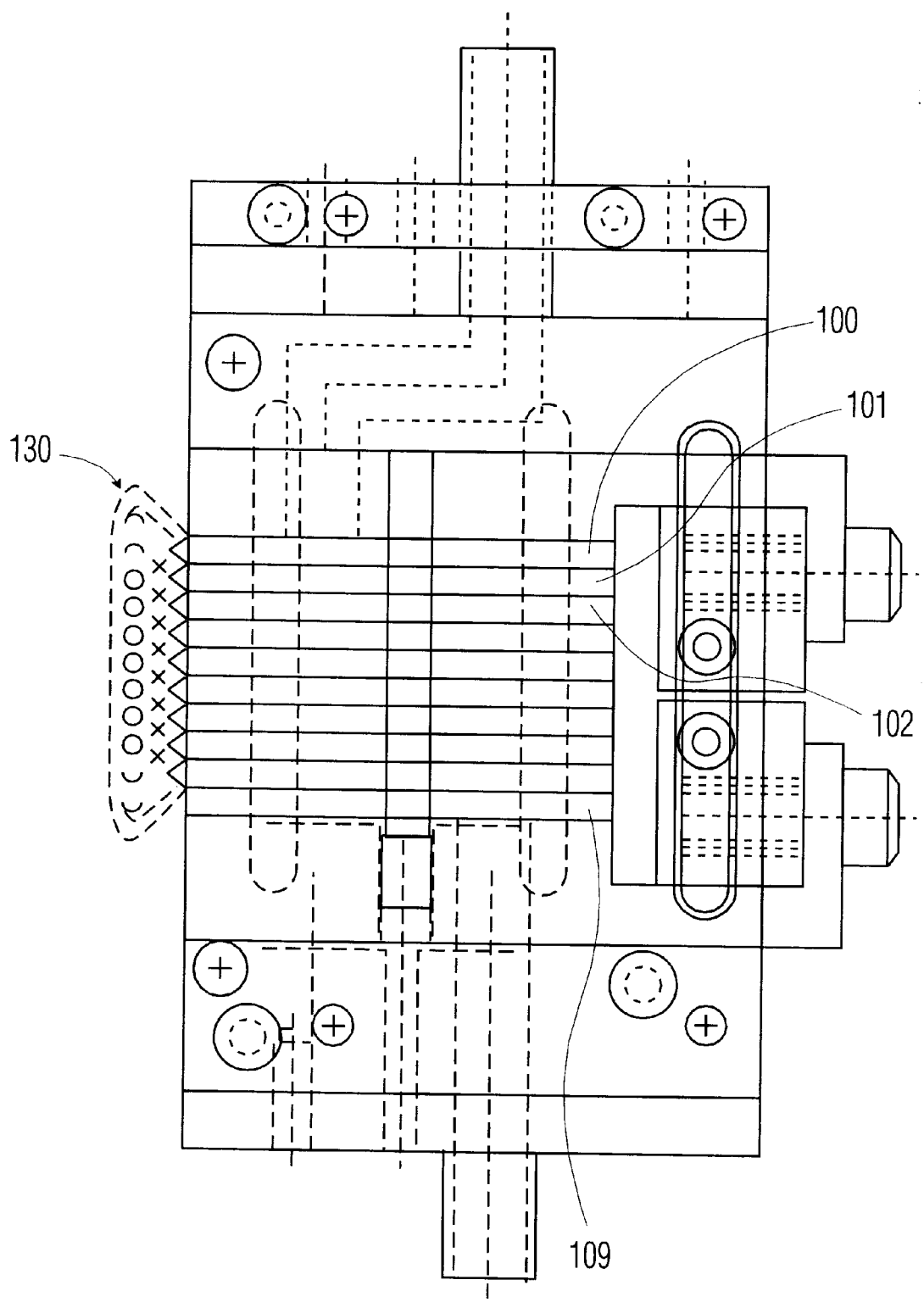
FIG. 9 is a side view of a stack of heat sinks as shown in FIGS. 1–8.

FIG. 9 is a side view of a stack of heat sinks of the type shown in FIGS. 1–8 each with its own laser diode in place. The dimensions are also shown to provide an appreciation of the size of the assemblage. There are ten heat sinks 100, 101, 102–109 in the illustration of FIG. 10. The holes (21) can be seen to relate to holes (61 of FIG. 6) of a next adjacent heat sink in a stack exactly as the holes relate to the holes (20 of FIG. 2) of the instant stack. Thus, any number of heat sinks can be stacked conveniently, each with its own laser in place.

Figure 10:
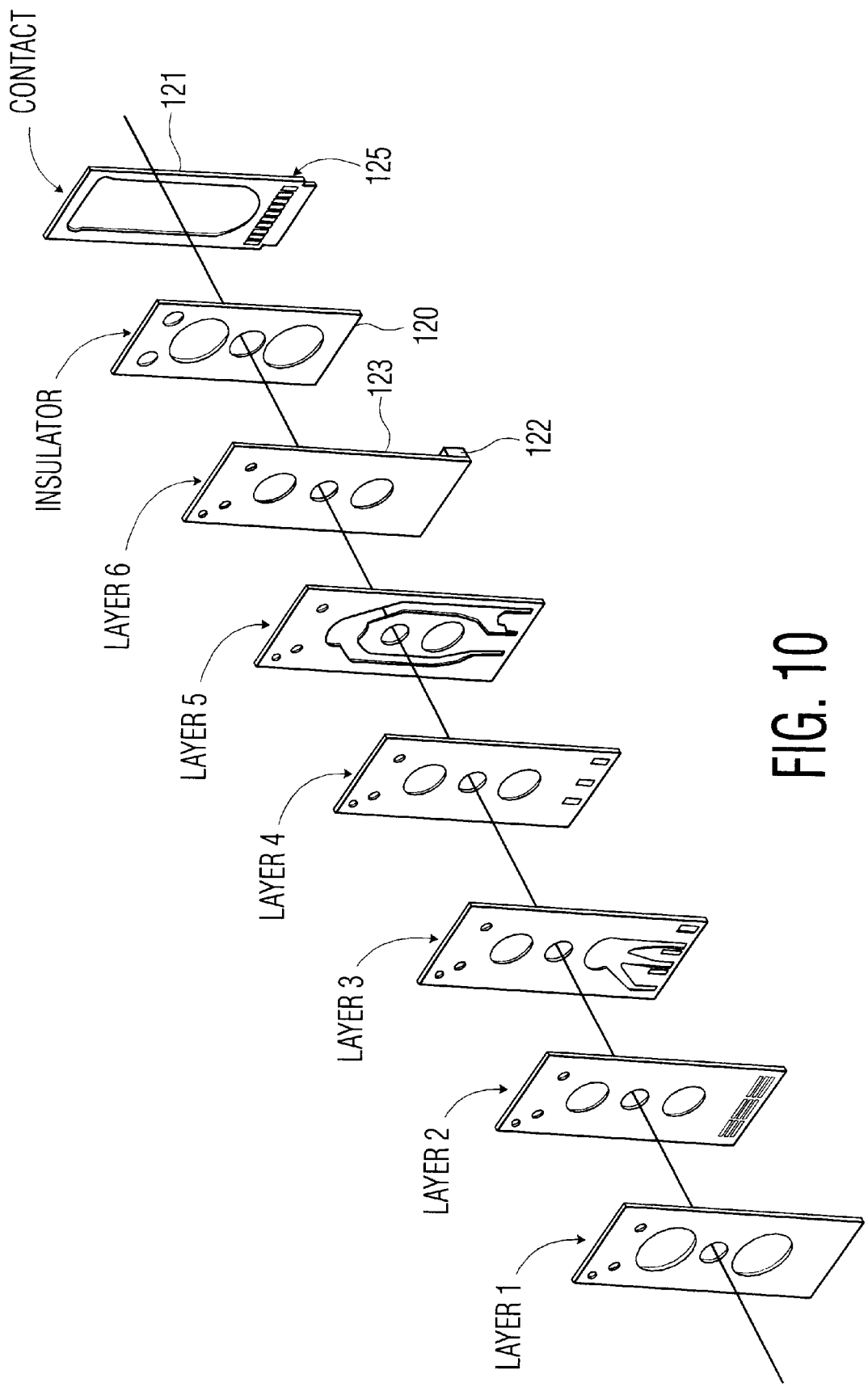
FIG. 10 is an exploded view of a heat sink of FIGS. 1–8 with a laser diode in place.

FIG. 10 is an exploded view of the heat sink of FIGS. 1–8 showing insulator layer 120 and frame—shaped electrical lead 121. Lead 121 can be seen to have a greater vertical dimension (as viewed) to permit the lead to bend into contact with a diode (or diode bar) 122 positioned along the edge of layer 123 which comprises a layer six of a heat sink (see FIG. 6).

In practice, the insulating layer has a thickness different from that of the laser or laser diode (122) typically greater than that of the diode. The resulting arrangement is illustrated in the side view of FIG. 11. The lead can be seen to overlie the insulating layer and to bend downward, as viewed, into contact with diode 122.

In accordance with the present invention, the lead (121) includes a plurality of slots at the bend to illuminate, or at least substantially reduce, stress which is common for bent leads of this type and which leads to device failures. Illustrative slots are shown at 125 in FIG. 10 and can be seen to comprise a set of like parallel slots having a long dimension aligned with the long dimension of the lead.

Figure 11:
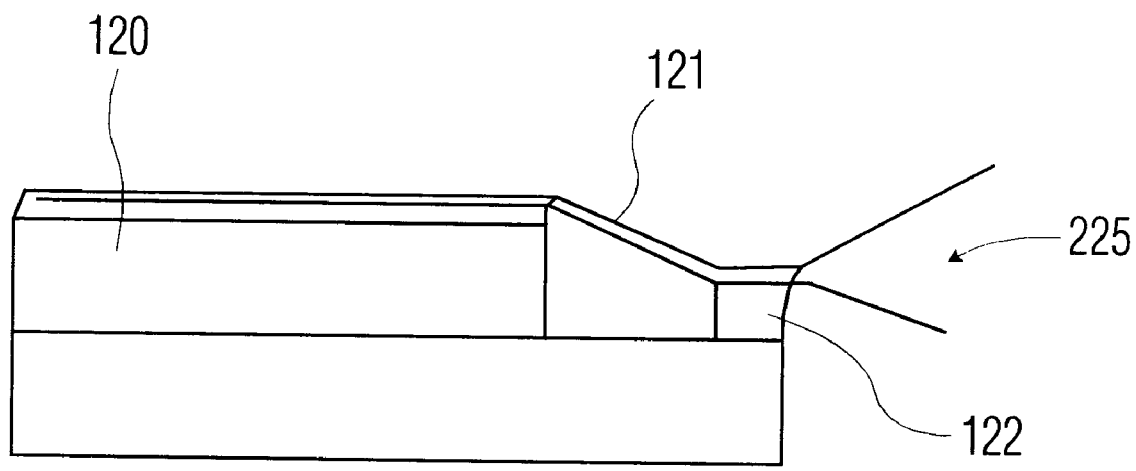
FIG. 11 is a side view of a single laser diode of the type shown in FIGS. 1–10.

The light emitting facet (or facets) of laser diode 122 is indicated by the diverging lines 225 in FIG. 11. The broken lines 130 to the left in FIG. 9, as viewed, represent the light from the light emitting facets of the stack illustrated.

What is claimed is:

1. A laser diode structure comprising an electrically conducting heat sink having a first surface, a laser diode being mounted on said first surface at a first edge thereof, said laser diode having a first thickness, an electrically insulating laser extending over said first surface into close proximity to said laser diode, said insulating layer having a second thickness different from said first thickness, sad structure including an electrically conducting lead overlying said insulating layer and bending for making electrical connection to said laser diode, said lead having a plurality of slots therein at the position of said bending.

2. A structure as in claim 1 wherein said second thickness is greater than said first thickness.

3. A structure as in claim 2 wherein said lead has an axis and said slots are of like geometry and are in parallel with said axis.

4. A structure as in claim 3 wherein said laser diode includes a plurality of light emitting facets.

5. A structure as in claim 4 wherein said lead has an open frame geometry exposing said insulating layer therebeneath.

6. A plurality of structures as in claim 5 arranged in a stack, said insulating layers of each of said structures being patterned to permit leak-free communication of coolant between heat sinks of said stack.

7. A structure as in claim 2 wherein said laser diode includes a plurality of light emitting facets.

8. A structure as in claim 7 wherein said lead has an open frame geometry exposing said insulating layer therebeneath.

9. A plurality of structures as in claim 8 arranged in a stack, said insulating layer of each of said structures being patterned to permit leak-free communication of coolant between the heat sinks of said stack.

10. A structure as in claim 2 wherein said lead has an open frame geometry exposing said insulating layer therebeneath.

11. A structure as in claim 10 wherein said lead has an open frame geometry exposing said insulating layer therebeneath.

* * * * *